United States Patent [19]

Shaparew

[11] 4,419,780
[45] Dec. 13, 1983

[54] HONEY DRYING VENTILATOR FOR BEEHIVES

[76] Inventor: Vladimir Shaparew, 3371 Trafalgar Rd., R.R. #1, Oakville, Ontario, Canada, L5J 4Z2

[21] Appl. No.: 228,774

[22] Filed: Jan. 27, 1981

[30] Foreign Application Priority Data

Oct. 17, 1980 [CA] Canada .................................. 362605

[51] Int. Cl.³ ............................................. A01K 47/06
[52] U.S. Cl. ........................................................ 6/1
[58] Field of Search ................ 6/1, 4 R, 4 B, 7, 12 R, 6/12 M

[56] References Cited

U.S. PATENT DOCUMENTS

| 2,232,343 | 2/1941 | Sauter | 6/1 |
| 2,434,090 | 1/1948 | Alton | 6/1 |
| 2,574,768 | 11/1951 | Taylor | 6/1 |
| 2,584,305 | 2/1952 | Taylor | 6/1 |
| 3,999,237 | 12/1976 | Solomon | 6/1 |

Primary Examiner—Gene Mancene

Assistant Examiner—Robert P. Swiatek
Attorney, Agent, or Firm—Donald E. Hewson

[57] ABSTRACT

A honey drying ventilator for beehives is intended for installation on the top-most honey super of the beehive, and is a frame which fits above the top most super and has an opening in one of the front, back or side members thereof. Preferably, the opening faces in the same direction as the bottom bee entrance of the beehive. A closure element which covers the opening is closed below a predetermined temperature, and opens to an increasing amount above that predetermined temperature. The closure element has a bi-metallic element or strip which is secured at one end to the frame member near the opening. Screens may be placed behind or in front of the opening to preclude accidental ingress or egress of bees through it; and the element may be protected from above by an air impervious member so as to preclude the chance of propylis being placed above the closure element which might melt and drip onto the closure element at elevated temperatures.

9 Claims, 3 Drawing Figures

HONEY DRYING VENTILATOR FOR BEEHIVES

FIELD OF THE INVENTION

This invention relates to a ventilator for beehives, particularly a honey drying ventilator which is intended for installation in a beehive above the top most honey super thereof. A theoretical discussion of the honey drying within a beehive is made herein. The honey drying ventilator substantially precludes bee clustering during bee summer honey seasons, and thereby increases the honey production of a beehive in which it is installed.

BACKGROUND OF THE INVENTION

Bee clustering has been a common sight to all beekeepers, during spring and summer months. Sometimes, a substantial portion if not nearly all of the front face of the beehive may be covered with bees, with a cluster which may be about one inch thick. Indeed, even the bottom entrance to the hive may be covered. In such circumstances, as many as several pounds of bees may particiate in clustering, and the cluster may stay in place on the front of the beehive for several days. When a cluster occurs, this is indicative of a stressed or abnormal condition within the beehive, and one of its dangers—apart from decreased honey production—is that of swarming.

H. L. Wallace, U.S. Pat. No. 3,927,431, issued Dec. 23, 1975, teaches a ventilating spacer for beehives, which comprises a frame member which is intended to be installed over the top-most honey super and which comprises openings on two sides of the frame member. The principal reason for the provision of the ventilating spacer, according to Wallace, is to ventilate the hives so much that the formation of queen cells is suppressed and therefore that the natural tendency of bees to swarm is essentially negated. In other words, according to Wallace, a swarm, if it can be captured, is not a difficult problem to re-hive, although it is a great nuisance; but he is concerned that swarming occurs during honey flow or sometime previous to the main honey flow, but can be reduced by providing excessive ventilation which, he suggests, suppresses the tendency of the bees to build a number of queen cells as a preliminary step to swarming.

I have discovered that clustering of bees, which may or may not lead to swarming, in any event may be precluded in several different manners. One way, also suggested by Wallace,(above), is by staggering the brood chambers by one-quarter or three-eighths (0.25 to 0.375) inches, which creates slots in the front and back of the hive. This, however, creates several other problems including the necessity for additional bees to guard against robber bees from other hives, the increased likelihood that wax moths may enter the hive, and most particularly the fact that during cool nights and in cool weather the hives lose too much heat, thereby requiring that the bees consume more honey to generate the additional heat being lost.

As noted, bee clustering may lead to swarming, and has been suggested in some publications as being a consequence of excessive heat within a hive.

Following considerable observations and study, I have determined the following:

1. Bees cluster only on strong hives. Weak hives do not cluster;

2. Bee clustering takes place when the ambient air temperature is about 60° F. and higher.

3. Clustering seems to occur irrespective of the location of the hive. Clustering may occur whether the hive is in the sun, or in the shade.

4. Clustering occurs predominantly when the ambient air is moist, having a high relative humidity (usually 80% R.H., or more).

5. I have found that, if the top cover of a beehive is lifted at the front by, say, one fourth (0.25) inch and is supported to leave that opening, the cluster within the hive will disappear within one to three hours.

6. Clustering occurs generally when nectar is available, and usually not otherwise.

7. All of the bees at the bottom entrance to the beehive, which are visible from the outside, and which are fanning their wings, are facing the hive. In such a position, those bees can only drive the air out of the hive.

8. Hives which have been propylized heavily, exhibit a higher frequency of clustering and clustering may be of longer duration.

9. After the spring or early summer inspection of the bees by the beekeeper, the bees are not in any hurry to re-propylize the beehive, particularly at the interface between the underside of the top board or cover of the beehive, and the top-most honey super.

From the above observations, I have arrived at the following thesis, which has led to the development of the honey drying ventilator for beehives, according to the present application.

It appears that the real cause or reason for clustering in beehives is not, as previously suggested, a tendency to swarm or excess heat within the beehive; the clustering occurs because there is an inadequate air supply to dry the nectar which has been collected by the bees. The average quality nectar contains about 27% sugars, and 73% water; whereas, honey contains approximately 81% sugars and about 19% water. Thus, it takes approximately three pounds of nectar from which two pounds of water must be evaporated to produce one pound of honey. On the average, I estimate that there will be about 5,000 cubic feet of ambient air required to move through the hive, in order to evaporate two pounds of water and thus to produce one pound of honey. A detailed discussion occurs hereafter.

In order to move air through the beehive, the bees fan their wings at the bottom bee entrance, and by doing so they create a partial vacuum within the hive. As a result, air enters the hive through unpropylized interfaces and cracks between the supers, and also between the top-most super and the underside of the top board. When an insufficient amount of air enters the hive, as many bees as may be required move out of the hive and cluster on the front wall thereof, so that the remaining bees within the hive can better circulate the air within the hive. When an adequate opening is provided at the top of the hive, then enough air will enter the hive and the bee cluster on the front face thereof disperses, and bees can then go about their normal business of collecting more nectar for the production of more honey.

I have discovered, by careful observation of the air flow at the top and bottom of a beehive during the honey season, that when honey is drying the air enters the beehive through the upper opening if one is provided, or through the unpropylized cracks as discussed above, and that moisture laden air is discharged from the hive through the bottom entrance. When the bees stop the honey drying process—i.e., when the bees facing the bottom entrance to the hive stop fanning their wings—normal convention flow of air through the hive takes over. That is, when the honey drying operation is stopped by the bees, warmer air within the hive rises to the top and exits therefrom.

To the best of my knowledge, the fact of air flowing through the top opening into the hive, during the honey drying process, has been unobserved and unrecorded previously.

The provision of the upper air inlet opening for the hives gives the following benefits:

1. There is an adequate supply of air for the honey drying process, so that the honey will contain less water—be dryer and sweeter—than honey produced in comparable hives without an upper air inlet.

2. The elimination of clustering of the bees on the front of the hive releases those bees for more productive work, e.g. gathering nectar for the production of more honey.

3. The elimination of clustering on the front of hives reduces the tendency for swarming.

It now appears, therefore, that there are two opposing requirements that the bees have, with respect to air flow through the beehive and the supply of air to the bee hive. On the one hand, the bees wish to make the hive almost airtight by propylizing it, so as to prevent heat loss from the hive during cold weather. On the other hand, the bees require large amounts of air to dry the nectar and to make honey, and this in turns requires that there be an opening at the top of the beehive.

The honey drying ventilator for beehives, of the present invention, satisfies both of those requirements; and particularly, because it is such that air flow through the beehive is permitted from the top to the bottom only during the weather conditions that the bee activity is directed towards honey production. In other words, air flow downwards through the beehive is required only at the time the bees are drying nectar within the hive and making honey—i.e., during the honey season—and only on days when the ambient air temperature is above about 65° F. This requirement is even greater when the temperature is above about 65° F. and the relative humidity is high.

Preferably, any ventilator should be located in the same face of the beehive as the bottom bee entrance. This is in contradistinction to Wallace, which requires two opposed sets of openings in his ventilator spacer, to provide and promote cross flow. Of course, as noted, the ventilation openings of Wallace are always open.

When the ventilator opening of the honey drying ventilator according to the present invention is in the same face of the beehive as the bottom bee entrance, this precludes draft through the bee hive as a consequence of wind. If the wind blows in a direction which is normal to the face of the hive containing the openings, at top and bottom then the pressure against the openings is substantially equal and there is no forced air circulation through the beehive. If the openings are in the other faces, either back or side relative to the face in which the bottom opening is placed, a draft will occur, and air continuously flows through the hive as a consequence of forced air circulation, for so long as the wind continues to blow. Such a draft is not only undesirable, but it could be very detrimental if, for example, a draft of cold air were to kill a brood of unborn bees within the hive.

I have also noticed, as an adjunct to use of the honey drying ventilator for bee hives according to this invention, that it is helpful to reduce the height of the bottom bee entrance in the hive which improves the efficiency of the bees in pumping out drying air from the hive, and lessens the chances for a localized air eddycurrent to establish.

Further, any bee entry holes on the front wall of brood chambers within the hive should be blocked or plugged, because air entering those holes passes down along the brood chamber wall to the bottom bee entrance, without doing any honey drying, and thereby reducing the efficiency because of the required additional air flow pumping action of the bees at the bottom bee entrance to move such air.

SUMMARY OF THE INVENTION

The purpose of the present invention is to provide a honey drying ventilator for beehives which permits honey drying air circulation through the beehive in the manner established by the bees, and at temperatures above a predetermined temperature, so as to preclude clustering of bees on the front of the hive, and thereby so as to achieve more efficient honey production.

A further object of this invention is to provide a honey drying ventilator for beehives, as noted above, which may be easily and inexpensively produced, no matter whether in small or large quantities.

BRIEF DESCRIPTION OF THE DRAWINGS

The objections, features and advantages of the present invention are more fully discussed hereafter, in association with the accompanying drawings, in which.

DESCRIPTION OF THE PREFERRED EMBODIMENTS

Figure 1:
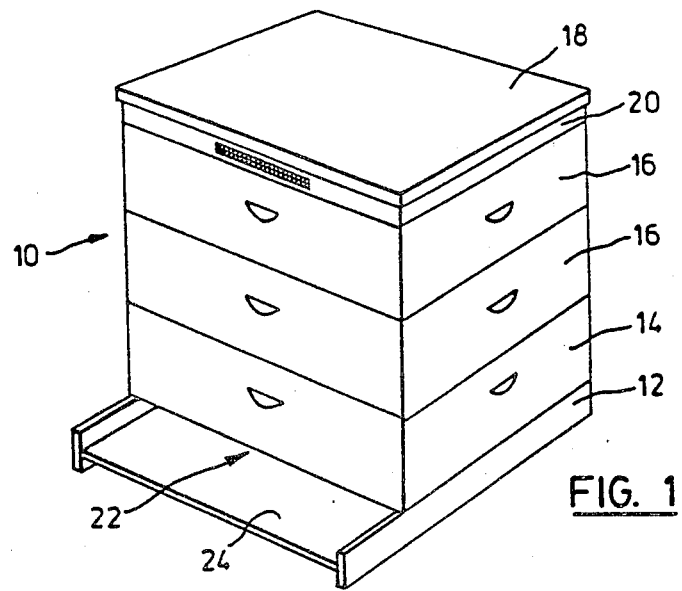
FIG. 1 is a perspective view of a beehive having a honey drying ventilator according to the present invention installed therein.

The ventilator of the present invention, a honey drying ventilator for beehives, is intended for installation in bee hives of the sort shown generally at 10 in FIG. 1. That hive comprises a base board assembly 12, a brood chamber 14, and in this case, two honey supers 16. A top board 18 is placed over the hive 10, and a honey, drying ventilator 20 is superimposed between the underside of top board 18 and the top-most super 16. The bottom bee entrance is provided at 22, beneath the brood chamber 14 and above the landing board 24 of the bottom board assembly 12.

Figure 2:
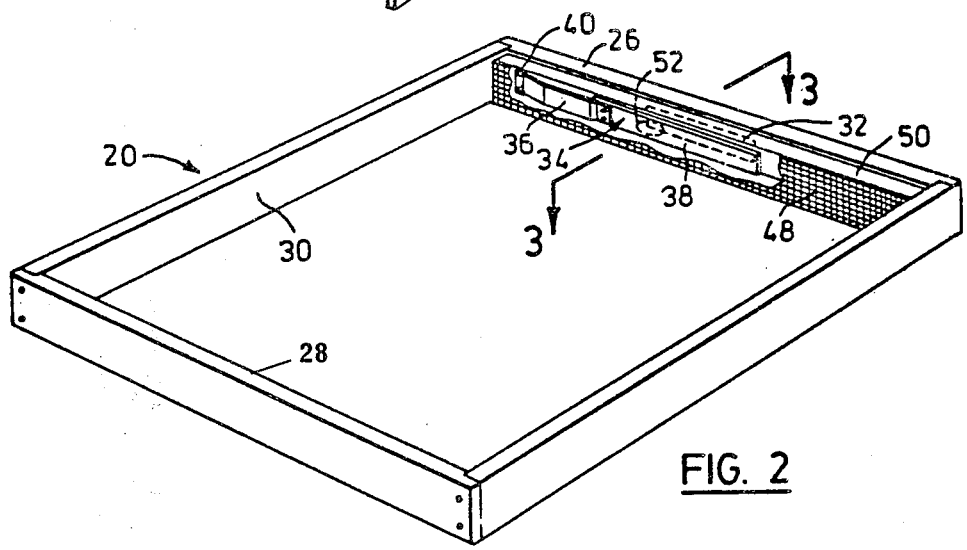
FIG. 2 is a perspective view to a much larger scale of a frame including a honey drying ventilator, according to this invention.
Figure 3:
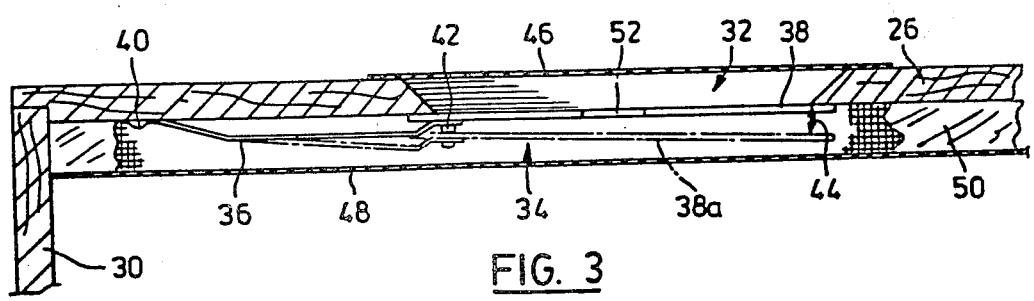
FIG. 3 is a partial cross-section, looking from above in the direction of arrow 3—3 of FIG. 2, showing the operation of the honey drying ventilator of the present invention.

With specific reference to FIGS. 2 and 3, it will be seen that the ventilator 20 has substantially the same outer dimensions as the honey super 16, and comprises a frame which has front, back and side members. In this case, the front frame member 26 is the frame member which is furthest away from the viewer in FIG. 2. The rear frame member is designated at 28 and the side frame members at 30. An opening 32 is formed in one of the front, back or side members; and in the embodiments shown, the front frame member 26. A closure element 34 is provided, which is capable of covering and uncovering at least a portion of the opening 32 upon change of ambient air temperature; and said closure element 34 has a portion 36 which is such that it may change its physical positioning upon a change of ambient air temperature. The arrangement of the closure element 34 is such that the opening 32 is substantially fully covered at any temperature which is below a predetermined temperature of the ambient air. In general, the closure element 34 may have an element 36 which is such that it coils or uncoils upon change of ambient air temperature, so as to cover or uncover more or less of the opening 32. More generally, however, I have found it convenient to provide the closure element 34 so that the portion 36 is a bi-metallic strip, and the portion 38 is a simple wooden slat member carried by the bi-metallic strip.

In the embodiments shown, the closure element is mounted on the inside surface of the front frame member 26, and is secured thereto by suitable fastening means 40. The slat element 38 is secured to the bi-metallic strip also by suitable fastening means 42, which may be short screws, rivets, or otherwise.

It will be seen from FIGS. 2 and 3, that the closure element 34 is mounted in such a way that, as shown in solid lines in FIG. 3, at any temperature below a predetermined temperature, the opening 32 is closed or covered by the closure element—and particularly by the slat member 38 thereof. The bi-metallic strip 36 is shaped and mounted in such a manner that the strip will change its physical position and thereby move the slat element 38 away from the opening 32 when the ambient air temperature is above a predetermined temperature, and so that as the air temperature rises the amount by which the opening 32 is uncovered is greater. This is shown by chain lines in FIG. 3, with the slat element in the open position 38a, having moved a distance away from the inside surface of the front frame member 26 by a distance indicated at arrow 44.

I have found that the ambient air temperature below which the opening 32 is fully covered should be about 65° to 70° F. The choice and configuration of the bi-metallic element is, therefore, one which is predicated upon the dimensions of the opening and of the closure member 34, and of the predetermined temperature at which the closure element will begin to open and uncover the opening 32. A specific example is given hereafter.

A screen covering 46 over the opening 32 may be provided on the outside face of the frame member 26. This screen cover is, of course, optional; but if it is not provided the bees from the hive may use the opening 32 as an upper entrance into the hive. From the beehive management point of view, as determined by the bee keeper, the screen cover 46 may be advisable. If it is applied, it should of course be of a mesh size which will prevent bees from entering but not of such a size as to cause any significant impedement to air flow through the opening 32.

I have further determined that, if possible, it is advisable to provide a screen covering 48 on the inside of the ventilator frame, which precludes bees from interfering with the opening and closing action of the closure element 34. It is therefore convenient that the screen element 48 should extend above and below the closure element 34, as well as behind it, so as to preclude access by the bees to the entire area or volume within which the closure element is working.

It is also advisable to provide an air impervious member 50 mounted at least in the area between the vertical screen element 48 and the inside surface of the frame member 26, above the closure element 34. This is because otherwise the bees may be inclined to attempt to propylize the horizontally disposed screening element 48 above the closure element 34; and since propylis melts at appoximately 90° to 100° F., in extreme temperature conditions, the propylis may melt and droplets fall onto the closure element 34 or into the opening 32 which would interfere with the operation of the closure element.

Indeed, in the preferred embodiment, an air impervious member 50 is provided both above and below the closure element, horizontally disposed, so that there is no right side up or upside down mounting for the ventilator frame 20 within a beehive 10.

Because there appears to be little inclination for the bees to venture outside the beehive to collect nectar when the ambient air temperature falls below 60° F., and that the activity of collecting nectar increases above 65° F. so that it is at its peak from 75° F. to 90° F., it is clear that the requirement for honey drying air flow through the hive is determined by or linked to the ambient air temperature at which an abundant nectar supply is available to the bees and the bees are active in collecting that nectar. Therefore, I have determined that the closure element 34 should operate in such a manner that the opening 32 is substantially closed or covered at temperatures below 65° F., and that the opening should gradually increase as ambient air temperature increases.

To do so, in a specific embodiment of the honey drying ventilator for beehives according to this invention which has been built, I employ a bi-metallic strip which is provided by Texas Instruments Incorporated under the trade mark TRUFLEX; and specifically, I employ a TRUFLEX type P675R, having a width of about 1"—height as seen with respect to element 36 in FIG. 2—and about 5" long and 0.020 inches thick. By bending and mounting the bi-metallic element such that it will begin opening at about 65° F., and having a wooden slat element cantilevered about 6" beyond the end of the bi-metallic element, of the same height (1") and about 0.25 inches thick, so that the entire length of the closure element is approximately 11", I have noted that the amount that the element will open at the end of the slat element 38 remote from the fasteners 40 by which the bi-metallic strip 36 is secured to the frame member 26 is approximately 0.034 to 0.038 inches (generally about 0.037 inches) for each degree F. rise of ambient air temperature. In terms of the length of the closure element, this can be stated to be about 0.0031 to 0.00345 inches per degree F. per inch of length of the closure element.

In the above working practical embodiment of the honey drying ventilator for beehives according to the present invention, the opening 32 is approximately 7" long at its inner end, and ¾ (0.75) inch high. Of course, a plurality of openings may be placed instead of the single opening 32; and, indeed, two or more smaller closure elements may be placed in a single frame member, depending upon other considerations such as frame size, etc. In the standard embodiment, the frame size is approximately 16.5 by 20" in its outside dimensions.

There follows some further discussion by which a mathematical development is made to demonstrate the increased honey efficiency which may be achieved utilizing a honey drying ventilator for beehives according to the present invention.

Assume that a beehive 10 is expected to produce 100 pounds of surplus honey, for collection by the bee keeper. That hive will be required to produce a further 80 pounds of honey which it will store for the winter, and will consume approximately 220 pounds of honey during the summer. Therefore, during the honey season, the hive must produce approximately 400 pounds of honey which must be dried. Assuming that during the honey season, there will be 100 nectar flowing days, the average daily honey production within the hive must therefore be 4 pounds per day. However, it is known that during a good honey flow, the bees may produce 10 pounds or more of honey per day.

As stated above, the average nectar contains approximately 27% sugars and 73% water. So as to produce a pound of honey with 81% sugars, three pounds of nectar must be collected from which two pounds of water must be evaporated.

The table appended hereto shows the volumetric air requirements to evaporate two pounds of water, at temperatures of 70°, 75°, 80° and 90° F., at relative humidities of ambient air entering the bee hive from 0 to 99%. It must be noted, however, that two assumptions are made with respect to the table, which are:

1. The air inlet and air outlet temperatures are the same;
2. The outlet air is at 100% relative humidity. Generally, of course, the relative humidity of the air coming from the hive during honey drying is less than 100%, and may be at a temperature higher than the air inlet temperature.

Taking the ideal conditions above, and with reference to the table, it is seen that at 75° F. ambient air temperature and 50% relative humidity, 2,966 cubic feet of ambient air is required to dry one pound of honey—i.e. to evaporate two pounds of water. For four pounds of honey production per day (see above), the requirement is for $2,966 \times 4 = 11,864$ cubic feet. If the relative humidity becomes 80%, the air requirement for four pounds of honey production is $7,415 \times 4 = 29,660$ cubic feet per day, which is approximately 2,280 pounds of air per day. On a 24 hour basis, this amounts to 26 cubic feet of air per minute.

Assuming that approximately 15,000 cubic feet of air is the volumetric limit of the capacity of the bees to pump air through the hive by pulling the air through cracks at the interfaces of the supers and of the top-most super to the top board, it follows that when the air requirement becomes greater the bees will stop bringing new nectar and will cluster out of the hive to permit as much honey drying air flow as possible, and without creating new or higher requirements by bringing further amounts of nectar. Thus, the requirement for additional ventilation, during nectar producing periods, is established.

Now it is accepted that the heat required to evaporate water from the nectar comes from the body heat of the bees within the hive. In order to evaporate two pounds of water, 2,100 B.T.U.'s of thermal energy is required. One pound of honey contains 1,380 calories of food value which is equivalent to 5,477 B.T.U.'s. Thus, to evaporate two pounds of water and to produce one pound of honey, the bees will consume $2,100/5,477 = 0.38$ pounds of honey. To dry 400 pounds of honey—to evaporate 800 pounds of water—, the bees will consume $0.38 \times 400 = 152$ pounds of honey.

Now, it has been noted that in beehives which do not have honey drying ventilators according to the present invention installed, the outlet air from the bottom entrance during a honey drying operation is about 4° F. higher than the outlet air from hives having honey drying ventilators according to the present invention installed, under exactly the same conditions. These observations come from placing similar hives of substantially equivalent strength (strong hives) in close proximity, where some hives have honey drying ventilators and some do not.

From the Table, assuming that all of the honey is dried at 75° F. ambient air temperature and 70° relative humidity, it is noted that the requirement is 4,943 cubic feet of ambient air required to dry one pound of honey.

However, in those hives which do not have honey drying ventilators, the temperature of the outlet air has warmed up by an additional 4° F., and in order to warm up the temperature to 4° F., there has been a requirement for additional honey consumption by the bees. This may be calculated as follows:

[Equation 1]

$$(f/13) \times 0.24 \times 4 = H$$

Where:
f = cubic feet of air to dry one pound of honey
13 is number of cu. ft. air per pound of air
0.24 is the specific heat of air (B.T.U.'s pound)
4 is temperature difference in °F.
H = B.T.U.'s/pound of honey
In numbers given the conditions above, this becomes:

$$4,943/13 \times 0.24 \times 4 = 365 \text{ B.T.U.'s/pound of honey}$$

Obviously, for 400 pounds of honey, the requirement becomes $365 \times 400 = 146,000$ B.T.U.'s, which is equivalent to $146,000/5,477 = 27$ pounds of honey.

By providing the top air inlet and thereby reducing the air outlet temperature, the expected savings in the present example can be $27/4 = 6.75$ pounds of honey per degree F. reduction in outlet temperature from the hive during honey drying operation.

However, as noted, it is not advisable to have a permanently open air inlet, because to do so provides a chimney action or convection flow of warm air upwards through the beehive when the honey drying operation has stopped. Assuming, for example, that the average ambient air temperature at night is 63° F. and that the duration of that temperature is 10 hours, and that there are 80 such nights during the honey season referred to above, the following calculation is made.

A further assumption is made that the day time temperature is always above 70° F., and that the velocity of warm air escaping from a permanently open top ventilation opening during convection flow of air through the beehives is two feet per second. In that case, the heat loss with the escaping warm air is calculated according to the following:

[Equation 2]

$$A \times v \times h \times 3600 \times 1/13 \times dF \times 0.24 = L$$

where A = area of opening in square feet
v = velocity of air through opening, feet per second
h = number of hours at 63° F.
3600 is number of pounds of air per cubic foot
dF = temperature difference, °F.
0.24 is the specific heat of air (B.T.U.'s/pound)
L = heat loss in B.T.U.'s
In numbers, using the above criteria, this becomes $$5.25/144 \times 2 \times 800 \times 3600 \times 1/13 \times 7 \times 0.24 = 27,100 \text{ B.T.U.'s}$$

This is equivalent to 27,100/5,477=5 pounds of honey lost due to escaping warm air through a permanently open ventilation opening.

Other alterations may be made to the honey drying ventilator, without departing from the spirit and scope of the appended claims.

TABLE

| Temperature of ambient air °F. | Relative Humidity of ambient air entering the hive, % | | | | | | | | | | | |
|---|---|---|---|---|---|---|---|---|---|---|---|---|
| | 0 | 10 | 20 | 30 | 40 | 50 | 60 | 70 | 80 | 90 | 95 | 90 |
| 70 | 1,738 | 1,931 | 2,172 | 2,483 | 2,897 | 3,476 | 4,345 | 5,793 | 8,690 | 17,380 | 34,760 | 173,800 |
| 75 | 1,483 | 1,648 | 1,854 | 2,119 | 2,472 | 2,966 | 3,708 | 4,943 | 7,415 | 14,830 | 29,660 | 148,300 |
| 80 | 1,268 | 1,409 | 1,585 | 1,811 | 2,113 | 2,536 | 3,170 | 4,227 | 6,340 | 12,680 | 25,360 | 126,800 |
| 90 | 936 | 1,040 | 1,170 | 1,337 | 1,560 | 1,872 | 2,340 | 3,120 | 4,680 | 9,360 | 18,720 | 93,600 |

Of course, the above numerical examples are based on the thesis arrived at earlier, but are substantiated by observations and experience.

In summary, the benefits derived from use of a honey drying ventilator according to the present invention include the following:

1. Higher honey yield because of elimination of bee clustering during periods of abundant nectar supply;
2. Reduced honey consumption by the bees because of reduced outlet air temperature during honey drying;
3. Reduced honey consumption by the bees at temperatures below a predetermined temperature when the ventilator closure element closes;
4. Dryer honey—i.e., honey which contains less water, and which is therefore less prone to deterioration in storage;
5. A permanently reduced bottom bee entrance (which may be further reduced across its width for winter). This reduced height of entrance helps to preclude the possibility of wax moth invasion of the hive, robbing by bees from other hives, and the entry of mice into the hive; and as well, reduces the heat loss from the hive during colder weather.

A honey drying ventilator for bee hives has been discussed above, with theoretical and practical discussion concerning observations made and the relevance of air flow through the hive with the importance of the ability to preclude air flow below certain temperatures and to enhance or promote air flow above those temperatures, especially during honey drying operations. Specific working examples have been given.

It has been noted that rather than a hinging action of a bi-metallic strip, a coiling and uncoiling action may occur. Also, specific references have been made to structure which eliminates the tendency of bees to propylize the structure around the honey drying ventilator, so that the honey drying ventilator may be kept in place even during periods of colder weather, unlike prior art ventilators which are required to be removed from the beehive during periods of colder weather.

Also, there may be conditions when it is desirable to provide a small hole, say ⅜ (0.375)inch, through the closure element 38, as shown at 52 in FIGS. 2 and 3. This small hole provides for a small flow of honey drying air at times when the opening 32 is otherwise closed; and, when the honey drying process is not in progress, it serves to provide convective ventilation for the hive.

What I claim is:

1. A honey drying ventilator for beehives, having substantially the same outer dimension as a honey super, and intended for installation above the top-most honey super, comprising:
a frame having front, back and side members;
an opening through one of said front, back or side members;
and a closure element capable of covering and uncovering at least a portion of said opening upon change of ambient air temperature said closure element having a first portion thereof which may change its physical positioning upon change of ambient air temperature, and a second rigid portion thereof adapted to cover said opening; said closure element being arranged so that said rigid portion is swingably moved with respect to said opening to the extent that said opening is substantially fully covered by said rigid portion at any temperature below a predetermined temperature of the ambient air.

2. The ventilator of claim 1, where said first portion of said closure element is a bi-metallic strip; one end of which is secured to said frame member.

3. The ventilator of claim 2, where said predetermined temperature below which said opening is substantially fully covered is 65° F.

4. The ventilator of claim 2, further comprising a screen covering over said opening.

5. The ventilator of claim 2, where said closure element is mounted on the inside surface of said frame member and further comprising a screen mounted behind said closure element.

6. The ventilator of claim 5, where said screen extends above and below said closure element.

7. The ventilator of claim 5, where an air impervious member is mounted between said screen and said inside surface of said frame member, at least above said closure element.

8. The ventilator of claim 2, where said closure element is mounted so as to open to about 0.0031 to 0.00345 inches per degree F. per inch of length of said closure element, at the end thereof, in a direction away from said frame member.

9. The ventilator of claim 2, where said predetermined temperature below which said opening is substantially fully covered is 70° F.

* * * * *